US009477302B2

(12) United States Patent
Kauffmann et al.

(10) Patent No.: US 9,477,302 B2
(45) Date of Patent: Oct. 25, 2016

(54) SYSTEM AND METHOD FOR PROGRAMING DEVICES WITHIN WORLD SPACE VOLUMES

(75) Inventors: Alejandro Kauffmann, San Francisco, CA (US); Aaron Joseph Wheeler, San Francisco, CA (US); Liang-Yu Chi, San Francisco, CA (US); Hendrik Dahlkamp, San Francisco, CA (US); Varun Ganapathi, Palo Alto, CA (US); Yong Zhao, San Jose, CA (US); Christian Plagemann, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 464 days.

(21) Appl. No.: 13/572,128

(22) Filed: Aug. 10, 2012

(65) Prior Publication Data

US 2015/0153822 A1 Jun. 4, 2015

(51) Int. Cl.
*G06F 3/01* (2006.01)
*H04L 12/28* (2006.01)
*G06K 9/00* (2006.01)
*H04N 13/02* (2006.01)
*G01B 11/25* (2006.01)

(52) U.S. Cl.
CPC ............... *G06F 3/011* (2013.01); *G06K 9/00* (2013.01); *H04L 12/282* (2013.01); *G01B 11/25* (2013.01)

(58) Field of Classification Search
CPC ..................................................... G06T 19/00
USPC ........... 345/156, 157, 419; 348/14.01, 14.16, 348/46; 382/128
See application file for complete search history.

(56) References Cited

U.S. PATENT DOCUMENTS

| 7,102,615 | B2 | 9/2006 | Marks |
| 7,533,806 | B1 * | 5/2009 | Enright et al. ................ 235/379 |
| 7,940,986 | B2 | 5/2011 | Mekenkamp et al. |
| 8,321,885 | B2 * | 11/2012 | Pino, Jr. .............. H04L 12/2818 348/14.04 |

(Continued)

OTHER PUBLICATIONS

Bourgeous, Mike. Home automation and lighting control with Kinect, [online], Mar. 8, 2011, [retrieved on Oct. 9, 2014]. Retrieved from the Internet <URL:http://blog.mikebourgeous.com/2011/03/08/home-automation-and-lighting-control-with-kin/>.*

(Continued)

*Primary Examiner* — Christopher S Kelley
*Assistant Examiner* — Kathleen Walsh
(74) *Attorney, Agent, or Firm* — Lerner, David, Littenberg, Krumholz & Mentlik, LLP

(57) ABSTRACT

Aspects of the present disclosure relate to controlling the functions of various devices based on spatial relationships. In one example, a system may include a depth and visual camera and a computer (networked or local) for processing data from the camera. The computer may be connected (wired or wirelessly) to any number of devices that can be controlled by the system. A user may use a mobile device to define a volume of space relative to the camera. The volume of space may then be associated with a controlled device as well as one or more control commands. When the volume of space is subsequently occupied, the one or more control commands may be used to control the controlled device. In this regard, a user may switch a device on or off, increase volume or speed, etc. simply by occupying the volume of space.

11 Claims, 16 Drawing Sheets

(56) References Cited

U.S. PATENT DOCUMENTS

| | | | |
|---|---|---|---|
| 8,457,353 B2* | 6/2013 | Reville et al. | 382/103 |
| 8,503,720 B2* | 8/2013 | Shotton et al. | 382/103 |
| 8,514,218 B2* | 8/2013 | Hong et al. | 345/419 |
| 8,638,985 B2* | 1/2014 | Shotton et al. | 382/103 |
| 8,649,554 B2* | 2/2014 | Markovic et al. | 382/103 |
| 8,811,719 B2* | 8/2014 | Wilson et al. | 382/154 |
| 8,854,433 B1* | 10/2014 | Rafii | G06F 3/017 348/42 |
| 8,942,428 B2* | 1/2015 | Snook et al. | 382/107 |
| 9,019,201 B2* | 4/2015 | Holmdahl et al. | 345/156 |
| 2004/0155962 A1 | 8/2004 | Marks | 348/169 |
| 2005/0166163 A1 | 7/2005 | Chang et al. | |
| 2006/0239523 A1* | 10/2006 | Stewart et al. | 382/128 |
| 2009/0116742 A1 | 5/2009 | Nishihara | |
| 2009/0307255 A1 | 12/2009 | Park | |
| 2010/0083189 A1 | 4/2010 | Arlein et al. | |
| 2010/0185408 A1 | 7/2010 | Wang et al. | |
| 2010/0241998 A1 | 9/2010 | Latta et al. | |
| 2010/0277411 A1* | 11/2010 | Yee et al. | 345/156 |
| 2010/0302145 A1* | 12/2010 | Langridge et al. | 345/157 |
| 2011/0025689 A1 | 2/2011 | Perez et al. | |
| 2011/0035666 A1 | 2/2011 | Geisner et al. | |
| 2011/0037608 A1 | 2/2011 | Hou et al. | |
| 2011/0050562 A1* | 3/2011 | Schoen | G01V 1/34 345/156 |
| 2011/0119640 A1* | 5/2011 | Berkes | G06F 3/011 715/863 |
| 2011/0136511 A1 | 6/2011 | Patoskie et al. | |
| 2011/0173204 A1 | 7/2011 | Murillo et al. | |
| 2011/0205151 A1 | 8/2011 | Newton et al. | |
| 2011/0205155 A1* | 8/2011 | Newton | G06F 3/011 345/157 |
| 2011/0210915 A1* | 9/2011 | Shotton et al. | 345/157 |
| 2011/0234366 A1 | 9/2011 | Feng et al. | |
| 2011/0255776 A1 | 10/2011 | Mark et al. | |
| 2011/0289455 A1* | 11/2011 | Reville | G06F 3/017 715/830 |
| 2011/0312311 A1 | 12/2011 | Abifaker et al. | |
| 2012/0026274 A1* | 2/2012 | Baker et al. | 348/14.01 |
| 2012/0051596 A1* | 3/2012 | Darnell et al. | 382/103 |
| 2012/0056801 A1 | 3/2012 | Bevilacqua et al. | |
| 2012/0092445 A1* | 4/2012 | McDowell et al. | 348/14.16 |
| 2012/0093320 A1 | 4/2012 | Flaks et al. | |
| 2012/0105585 A1* | 5/2012 | Masalkar et al. | 348/46 |
| 2012/0140042 A1* | 6/2012 | Albertson | G08B 13/19613 348/46 |
| 2013/0009861 A1* | 1/2013 | Valik et al. | 345/156 |
| 2013/0009865 A1* | 1/2013 | Valik | G06F 3/0304 345/156 |
| 2013/0040572 A1* | 2/2013 | Berrett | H04W 4/023 455/41.2 |
| 2013/0044128 A1* | 2/2013 | Liu | G09G 5/00 345/633 |
| 2013/0083003 A1* | 4/2013 | Perez | G06F 3/005 345/419 |
| 2013/0084970 A1* | 4/2013 | Geisner | A63F 13/10 463/29 |
| 2013/0257748 A1* | 10/2013 | Ambrus | G02B 27/0093 345/173 |
| 2014/0020635 A1* | 1/2014 | Sayers | A01K 15/021 119/721 |
| 2014/0049465 A1* | 2/2014 | Tremaine | G06F 3/017 345/156 |
| 2014/0078312 A1* | 3/2014 | Zalewski et al. | 348/169 |
| 2014/0132728 A1 | 5/2014 | Verano et al. | |
| 2015/0062004 A1* | 3/2015 | Rafii | G06F 3/017 345/156 |

OTHER PUBLICATIONS

Deleon, Nicholas. Video: Hack Turns Kinect Into Home Automation Assistant, TechCrunch [online], Mar. 9, 2011, [retrieved on Oct. 9, 2014]. Retrieved from the Internet <URL:http://techcrunch.com/2011/03/09/video-hack-turns-kinect-into-home-automation-assistant/>.*

Chen, Jason. Kinect for Home Automation Makes a Lot of Sense, Gizmodo [online], Mar. 9, 2011, [retrieved Oct. 9, 2014]. Retrieved from the Internet <URL:http://gizmodo.com/5780336/kinect-for-home-automation-makes-a-lot-of-sense>.*

Worth, Mike. Controlling the mains with [B]luetooth proximity, [online], Apr. 25, 2012, [retrieved on Oct. 9, 2014]. Retrieved from the Internet <URL:http://www.mike-worth.com/2012/04/25/controlling-the-mains-with-bluetooth-proximity/>.*

Gordon, Whitson, Automatically Turn Off Your Electronics When You Leave the Room, Courtesy of Bluetooth, Lifehacker, [online], Apr. 25, 2012, [retrieved on Oct. 9, 2014]. Retrieved from the Internet <URL:http://www.mike-worth.com/2012/04/25/controlling-the-mains-with-bluetooth-proximity/>.*

Caon et al., Context-Aware 3D Gesture Interaction Based on Multiple Kinects, (Oct. 23, 2011), pp. 6, Ambient 2011.*

XBox360: Kinect Adventures, (2010), pp. 2-3, Microsoft Corporation 2010.*

Bourgeous, Mike, Home automation and lighting control with Kinect, Mike Bourgeous Blog [online], Mar. 8, 2011, [retrieved on Oct. 9, 2014]. Retrieved from the Internet <URL:http://blog.mikebourgeous.com/2011/03/08/home-automation-and-lighting-control-with-kin/>.*

Deleon, Nicholas, Video: Hack Turns Kinect Into Home Automation Assistant, TechCrunch [online], Mar. 9, 2011, [retrieved on Oct. 9, 2014]. Retrieved from the Internet <URL:http://techcrunch.com/2011/03/09/video-hack-turns-kinect-into-home-automation-assistant/>.*

Chen, Jason, Kinect for Home Automation Makes a Lot of Sense, Gizmodo [online], Mar. 9, 2011, [retrieved Oct. 9, 2014]. Retrieved from the Internet <URL:http://gizmodo.com/5780336/kinect-for-home-automation-makes-a-lot-of-sense>.*

Worth, Mike, Controlling the mains with [B]luetooth proximity, [online], Apr. 25, 2012, [retrieved on Oct. 9, 2014]. Retrieved from the Internet <URL:http://www.mike-worth.com/2012/04/25/controlling-the-mains-with-bluetooth-proximity/>.*

Gordon, Whitson, Automatically Turn Off Your Electronics When You Leave the Room, Courtesy of Bluetooth, Lifehacker, [online], Apr. 25, 2012, [retrieved on Oct. 9, 2014]. Retrieved from the Internet <URL:http://lifehacker.com/5905218/automatically-turn-off-your-electronics-when-you-leave-the-room-courtesy-of-bluetooth>.*

Xbox360: Kinect Adventures, (2010), pp. 2-3.*

Caon et al., Context-Aware 3D Gesture Interaction Based on Multiple Kinects, (2011), 6 pages.*

M. M Bourgeous, Kinect Home Automation and Lighting Control; Home Automation with Kinect—Followup Q&A, Mar. 7, 2011; Mar. 17, 2011, respectively.*

M. Bourgeous, Kinect Home Automation and Lighting Control; Home Automation with Kinect—Followup Q&A, Mar. 7, 2011; Mar. 17, 2011, respectively.*

Adiyan Mujibiya, Takashi Miyaki and Jun Rekimoto, Anywhere Touchtyping: Text Input on Arbitrary Surface Using Depth Sensing, UIST' 10, 2010, 2 pages.

Decora Wall Switch PIR Occupancy Sensor, Leviton Mfg. Co., Inc. Lighting & Energy Solutions, 2011, 4 pages.

Gang Pan, Jiahui Wu, Daqing Zhang, Zhaohui Wu, Yingchun Yang, and Shijan Li, GeeAir: A Universal Multimodal Remote Control Device for Home Appliances, Pers Ubiquit Comput., Received: Jun. 1, 2009 / Accepted: Oct. 22, 2009 / Published online: Mar. 10, 2010, 13 pages.

J. Bernards, R. Nakamura and R. Tori, Comprehensive Model and Image-Based Recognition of Hand Gestures for Interaction in 3D Environments, The International Journal of Virtual Reality, 2011, 10(4); 11-23, 13 pages.

Maurizio Caon, Yong Yue, Julien Tscherrig, Elena Mugellini, Omar Abou Khaled, Context-Aware 3D Gesture Interaction Based on Multiple Kinects, Oct. 23, 2011, 6 pages, Ambient 2011.

(56) References Cited

OTHER PUBLICATIONS

Mohamed-Ikbel Boulabiar, Thomas Burger, Franck Poirier, and Gilles Coppin, A Low-Cost Natural User Interaction Based on a Camera Hand-Gestures Recognizer, Lecture Notes in Computer Science 2011, vol. 6762, Human-Computer Interaction, Interaction Techniques and Environments, pp. 214-221.

Naoyuki Kubota, Rikako Komatsu, Remote Monitoring and Universal Remote Control Based on iPhone in Informationally Structured Space, In Proceedings of the IIIS 3rd International Multi-Conference on Engineering and Technological Innovation, 2010, pp. 134-139.

Siddharth S. Rautaray, and Anupam Agrawal, Real Time Hand Gesture Recognition System for Dynamic Applications, International Journal of UbiComp (IJU), vol. 3, No. 1, Jan. 2012, 11 pages.

Wearable Depth-Sensing Projection System Makes Any Surface Capable of Multitouch Interaction (w/video), Oct. 17, 2011, 15 pages, Phys Org.com.

William T. Freeman, and Craig D. Weissman, Television Control by Hand Gestures, Mitsubishi Electric Research Laboratories, 7 pages, Dec. 1994.

Xia Liu and Kikuo Fujimura, Hand Gesture Recognition Using Depth Data, IEEE Int'l Conference on Automatic Face and Gesture Recognition, 2004, 6 pages.

\* cited by examiner

SYSTEM AND METHOD FOR PROGRAMING DEVICES WITHIN WORLD SPACE VOLUMES

BACKGROUND OF THE INVENTION

Various systems allow for the determination of distances and locations of objects. For example, depth cameras systems may use a light source, such as infrared light, and an image sensor. The pixels of the image sensor receive light that has been reflected off of objects. The time it takes for the light to travel from the camera to the object and back to the camera is used to calculate distances. Typically these calculations are performed by the camera itself.

Depth cameras have been used for various computing purposes. Recently, these depth camera systems have been employed as part of gaming entertainment systems. In this regard, users may move their bodies and interact with the entertainment system without requiring a physical, handheld controller.

SUMMARY

One aspect of the disclosure provides a method. The method includes receiving input defining a volume of space; receiving input identifying a controlled device; receiving input defining a control command for the controlled device; associating the volume of space, the controlled device, and the control command; storing the association in memory; monitoring the volume of space; when the volume of space is occupied by an object, identifying, by a processor, the control command and the controlled device associated with the volume of space; and using the control command to control the controlled device.

In one example, the volume of space is defined by receiving input indicating when to begin recording the volume of space; receiving input identifying a first location and a second location; and determining the volume of space based on the first location and the second location. In this example, determining the volume of space is further based on a volume extruded by moving a two or three-dimensional shape from the first location to the second location. Alternatively, determining the volume of space is further based on drawing a cuboid where the first location is one corner of the cuboid and the second location is another corner of the cuboid. In yet another alternative, the first location and the second location are the same location and define a closed shape, and determining the volume of space is further based on rotating the closed shape around an axis.

In another example, the input defining the volume of space is received from a depth camera and the depth camera is used to monitor the volume of space. In this example, the volume of space is defined relative to a coordinate system of a depth camera. Alternatively, the volume of space is defined relative to an object other than the depth camera such that if the object is moved, the location of volume of space with respect to the depth camera is moved as well. In this example, the object includes at least some feature of a user's body.

Another aspect of the disclosure provides a system including memory and a processor. The processor is configured to receive input defining a volume of space; receive input identifying a controlled device; receive input defining a control command for the controlled device; associate the volume of space, the controlled device, and the control command; store the association in the memory; monitor the volume of space; when the volume of space is occupied by an object, identify the control command and the controlled device associated with the volume of space; and use the control command to control the controlled device.

In one example, the processor is configured to define the volume of space by receiving input indicating when to begin recording the volume of space; receiving input identifying a first location and a second location; and determining the volume of space based on the first location and the second location. In this example, the processor is configured to determine the volume of space further based on a volume extruded by moving a two or three-dimensional shape from the first location to the second location. Alternatively, the processor is configured to determine the volume of space further based on drawing a cuboid where the first location is one corner of the cuboid and the second location is another corner of the cuboid. In another alternative, the first location and the second location are the same location and define a closed shape, and the processor is configured to determine the volume of space further based on rotating the closed shape around an axis.

In another example, the input defining the volume of space is received from a depth camera and the depth camera is used to monitor the volume of space. In this example, the volume of space is defined relative to a coordinate system of a depth camera. In an alternative, the volume of space is defined relative to an object other than the depth camera such that if the object is moved, the location of volume of space with respect to the depth camera is moved as well. In this alternative, the object includes at least some feature of a user's body.

A further aspect of the disclosure provides a non-transitory, tangible computer-readable storage medium on which computer readable instructions of a program are stored. The instructions, when executed by a processor, cause the processor to perform a method. The method includes receiving input defining a volume of space; receiving input identifying a controlled device; receiving input defining a control command for the controlled device; associating the volume of space, the controlled device, and the control command; storing the association in memory; monitoring the volume of space; when the volume of space is occupied by an object, identifying the control command and the controlled device associated with the volume of space; and using the control command to control the controlled device.

In one example, the volume of space is defined by: receiving input indicating when to begin recording the volume of space; receiving input identifying a first location and a second location; and determining the volume of space based on the first location and the second location.

DETAILED DESCRIPTION

In one example, input defining a volume of space, a controlled device, and a control command for the controlled device may be received. These inputs may be received in various ways as received in more detail below. The volume of space, the controlled device, and the control command may be associated with one another, and the associations may be stored in memory for later use.

The volume of space may be monitored to determine when it is occupied. When the volume of space is occupied, the control command and controlled device associated with the volume of space may be identified. The control command may then be used to control the controlled device.

Figure 1:
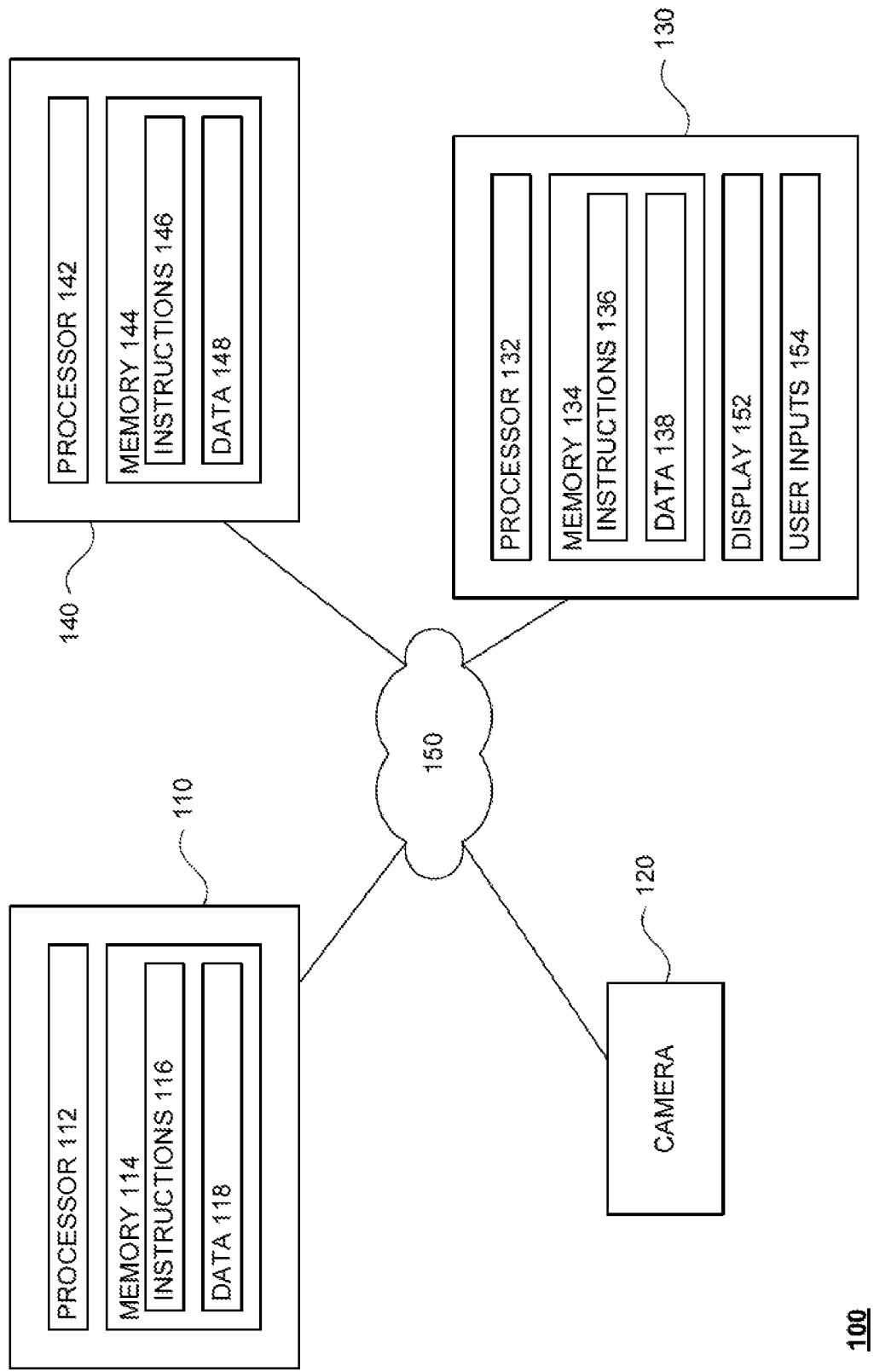
FIG. 1 is a functional diagram of a system in accordance with aspects of the disclosure.
Figure 2:
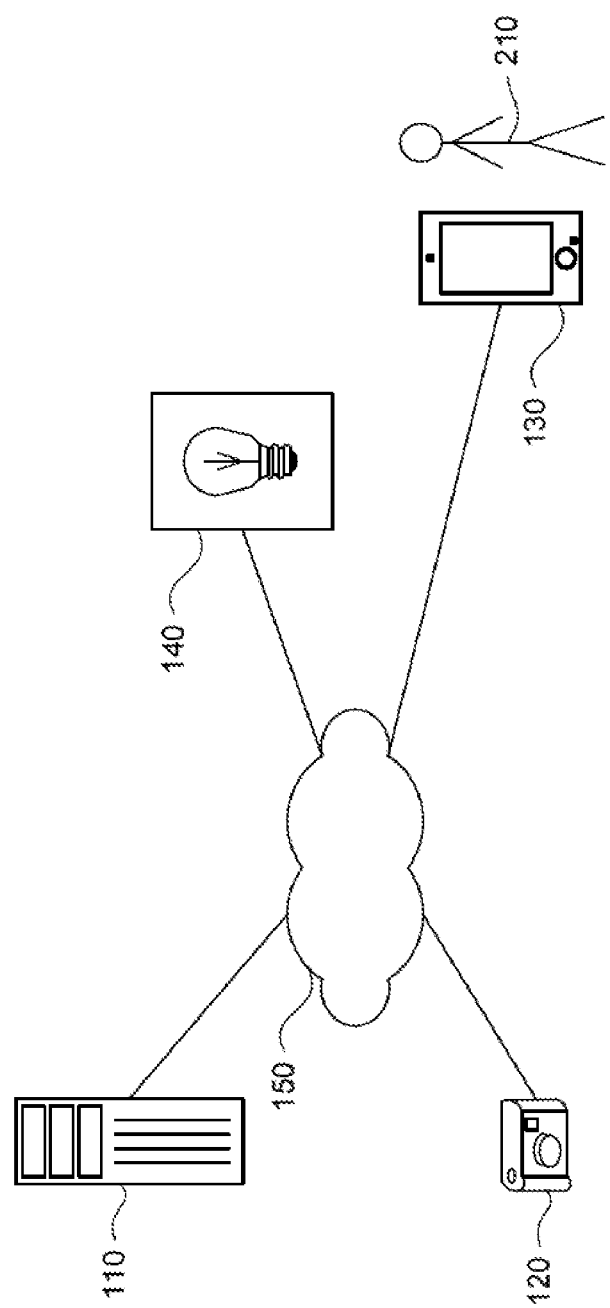
FIG. 2 is a pictorial diagram of the system of FIG. 1.

As shown in FIGS. 1-2, an exemplary system 100 may include devices 110, 120, 130, and 140. Device 110 may include a computer having a processor 112, memory 114 and other components typically present in general purpose computers. Memory 114 of computer 110 may store information accessible by processor 112, including instructions 116 that may be executed by the processor 112.

Memory may also include data 118 that may be retrieved, manipulated or stored by the processor. The memory may be of any type capable of storing information accessible by the processor, such as a hard-drive, memory card, ROM, RAM, DVD, CD-ROM, write-capable, and read-only memories.

The instructions 116 may be any set of instructions to be executed directly (such as machine code) or indirectly (such as scripts) by the processor. In that regard, the terms "instructions," "application," "steps" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

Data 118 may be retrieved, stored or modified by processor 112 in accordance with the instructions 116. For instance, although the system and method is not limited by any particular data structure, the data may be stored in computer registers, in a relational database as a table having a plurality of different fields and records, or XML documents. The data may also be formatted in any computer-readable format such as, but not limited to, binary values, ASCII or Unicode. Moreover, the data may comprise any information sufficient to identify the relevant information, such as numbers, descriptive text, proprietary codes, pointers, references to data stored in other memories (including other network locations) or information that is used by a function to calculate the relevant data.

The processor 112 may be any conventional processor, such as commercially available CPUs. Alternatively, the processor may be a dedicated device such as an application-specific integrated circuit (ASIC) or other hardware-based processor. Although FIG. 1 functionally illustrates the processor, memory, and other elements of computer 110 as being within the same block, it will be understood by those of ordinary skill in the art that the processor, computer, or memory may actually comprise multiple processors, computers, or memories that may or may not be stored within the same physical housing. For example, memory may be a hard drive or other storage media located in a housing different from that of computer 110. Accordingly, references to a processor, computer, or memory will be understood to include references to a collection of processors, computers, or memories that may or may not operate in parallel.

The computer 110 may be at one node of a network 150 and capable of directly and indirectly communicating with other nodes, such as devices 120, 130, and 140 of the network. The network 150 and intervening nodes described herein, may be interconnected via wires and/or wirelessly using various protocols and systems, such that each may be part of the Internet, World Wide Web, specific intranets, wide area networks, or local networks. These may use standard communications protocols or those proprietary to one or more companies, Ethernet, WiFi, HTTP, ZigBee, Bluetooth, infrared (IR), etc., as wells various combinations of the foregoing.

In one example, a device may comprise a camera, such as camera 120. The camera 120 may capture visual information in the form of video, still images, etc. In addition, camera 120 may include features that allow the camera (or computer 110) to determine the distance from and relative location of objects captured by the camera. In this regard, the camera 120 may include a depth camera that projects infrared light and generates distance and relative location data for objects based on when the light is received back at the camera, though other types of depth cameras may also be used. This data may be pre-processed by a processor of camera 120 before sending to computer 110 or the raw data may be sent to computer 110 for processing. In yet another example, camera 120 may be a part of or incorporated into computer 110.

Device 130 may comprise a client device configured to allow a user to program volumes of space. In this regard, client device 130 may be configured similarly to the computer 110, with a processor 132, memory 134, instructions 136, and data 138 (similar to processor 112, memory 114, instructions 116, and data 118). Client device 130 may be a personal computer, intended for use by a user 210 having all the components normally found in a personal computer such as a central processing unit 132 (CPU), display device 152 (for example, a monitor having a screen, a projector, a touch-screen, a small LCD screen, a television, or another device such as an electrical device that is operable to display information processed by the processor), CD-ROM, hard-drive, user inputs 154 (for example, a mouse, keyboard, touch-screen or microphone), camera, speakers, modem and/or network interface device (telephone, cable or otherwise) and all of the components used for connecting these elements to one another. For example, a user may input information into client device 130 via user inputs 154, and the input information may be transmitted by CPU 132 to computer 110. By way of example only, client device 130 may be a wireless-enabled PDA, hand-held navigation device, tablet PC, netbook, music device, or a cellular phone.

Controlled device 140 may be any device capable of being controlled by computer 110. As with client device 130, controlled device 140 may be configured similarly to the computer 110, with a processor 142, memory 144, instructions 146, and data 148 (similar to processor 112, memory 114, instructions 116, and data 118). For example, controlled device 140 may comprise a lamp which may be switched on or off in response to receiving instructions from computer 110. Similarly, controlled device 140 may comprise a separate switching device which interacts with computer 110 in order to control power to the lamp. Controlled device 140 may comprise or be configured to control operation (including, for example, powering on and off, volume, operation modes, and other operations) of various other devices such as televisions, radio or sound systems, fans, security systems, etc. Although the example of FIGS. 1 and 2 depicts only a single controlled device, computer 110 may be in communication with a plurality of different devices. Moreover, devices and computers in accordance with the systems and methods described herein may comprise any device capable of processing instructions and transmitting data to and from humans and other computers including general purpose computers, PDAs, network computers lacking local storage capability, set-top boxes for televisions, and other networked devices.

Returning to FIG. 1, data 118 in the memory 114 of computer 110 may store information relating a volume of space, a controlled device (such as device 140), and one or more control commands. This data may be stored in a database, table, array, etc. This information may be stored such that when a volume of space is identified, computer 110 may in turn identify a controlled device and one or more control commands. In addition, a single volume of space may be associated with multiple controlled devices with different control commands for each of the multiple controlled devices.

Although some functions are indicated as taking place on a single computer having a single processor, various aspects of the system and method may be implemented by a plurality of computers, for example, communicating information over network 150. In this regard, computer 110 may also comprise a web server capable of communicating with the devices 120, 130, 140. Computer 110 may also comprise a plurality of computers, e.g., a load balanced server farm, that exchange information with different nodes of a network for the purpose of receiving, processing and transmitting data to the client devices. In this instance, the client devices will typically still be at different nodes of the network than any of the computers comprising server 110.

In addition to the operations described below and illustrated in the figures, various operations will now be described. It should also be understood that the following operations do not have to be performed in the precise order described below. Rather, various steps may be handled in a different order or simultaneously. Steps may also be omitted unless otherwise stated.

Figure 3:
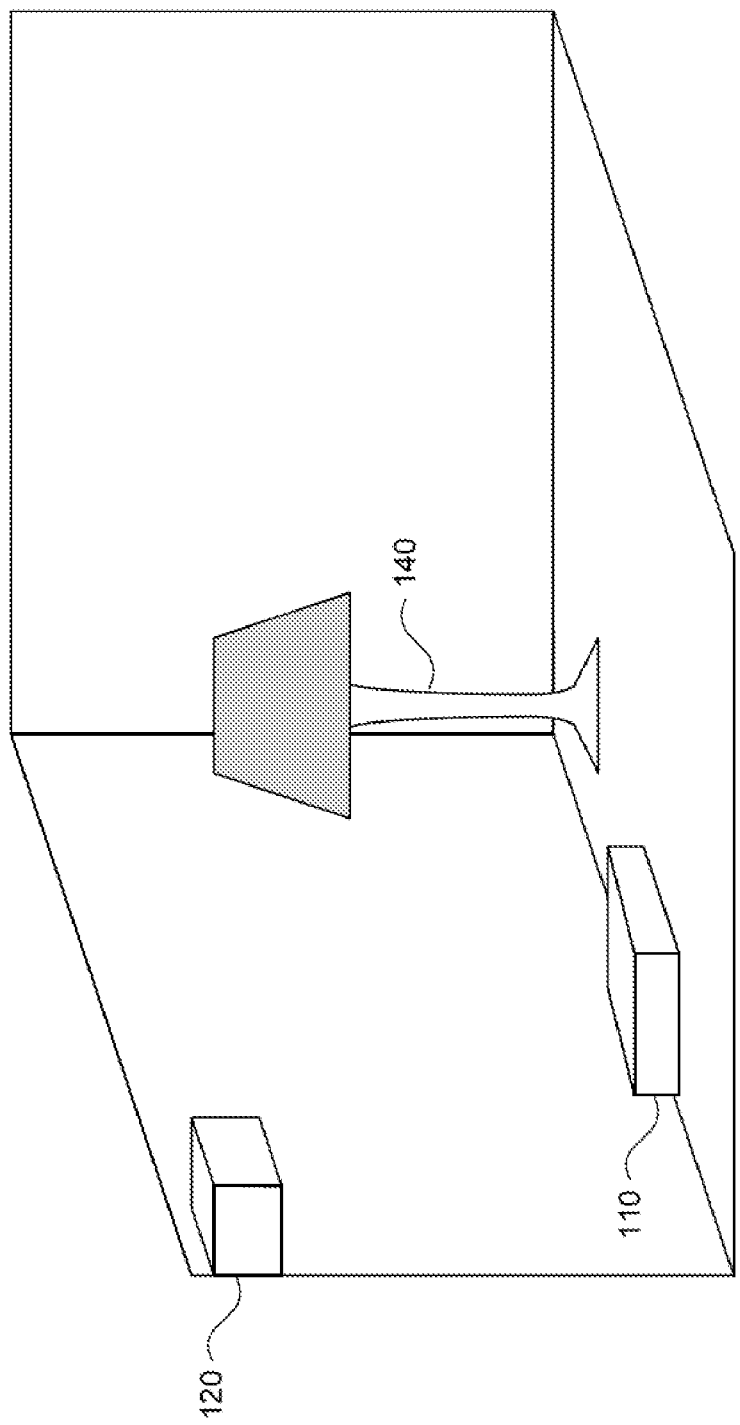
FIG. 3 is a diagram of an example room in accordance with aspects of the disclosure.

FIG. 3 depicts a room 300 having a computer 110, depth camera 120, and a controlled device 140. The camera is placed in a room in an appropriate location in order to allow the camera to capture spatial information about the room. Although only a single controlled device is depicted in room 300, computer 110 may be connected (wired or wirelessly) to any number of controlled devices that can be controlled by the computer. In addition, computer 110 is shown as being proximate to depth camera 120, but, as noted above, computer 110 may be networked in order to interact with depth camera 120. Again, computer 110 and depth camera 120 are configured such that depth camera 120 may send data about room 300 to computer 110.

Figure 4:
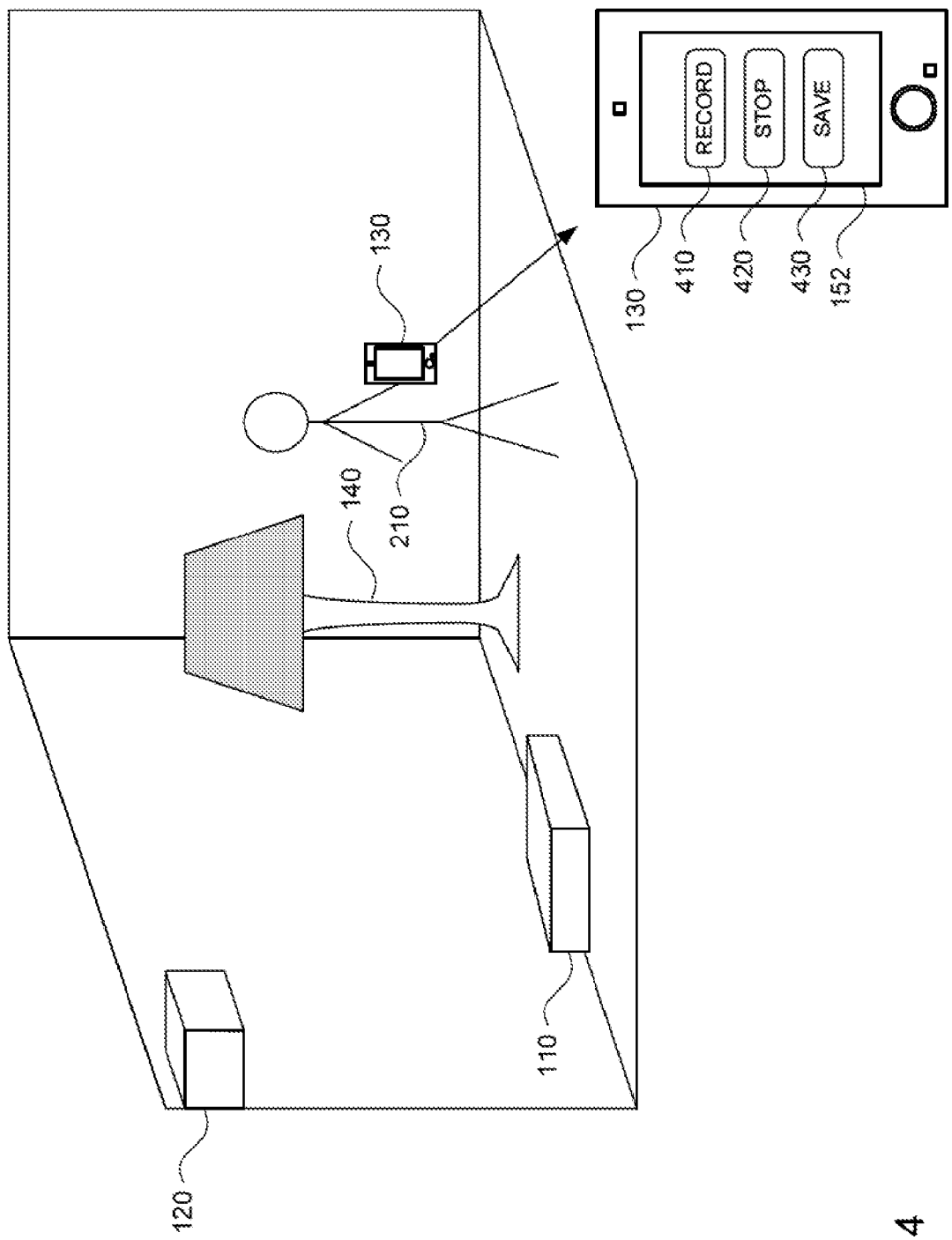
FIG. 4 is another diagram of the example room of FIG. 3 in accordance with aspects of the disclosure.

A client device may be used to define volumes of space in the room. As shown in FIG. 4, in room 300 a user 210 may hold client device 130 in a position such that the client device 140 is visible to the depth camera 120. The user may then indicate to the depth camera 120 that a volume of space is going to be defined. For example, user 210 may use the user inputs 154 of the client device 130 to select a record option 410. The client device may then transmit a signal to the depth camera 120 to begin defining a volume of space. Alternatively, the timing of the recording may be input into computer 110 or determined automatically (by identifying some signal from client device 130) at computer 110.

The user 210 may define a volume of space by moving the client device 130. As the client device 130 is moved, the movements are recorded by the depth camera 120 and sent to the computer 110. In this regard, the depth camera 120 may track the location of an image on the display 152 of client device 130 relative to an absolute coordinate system defined by the depth camera 120. The image may include a particular color block, displayed object, QR code, etc. When the user is finished, user 210 may use the user inputs 154 of the client device 130 to select a stop and/or save option (see stop option 420 and save option 430 of FIG. 4).

The location data captured by the depth camera 210 and defined by the user is then sent to the computer 110. Computer 110 may process the data to define a particular volume of space. As noted above the tracked location may be processed by a processor of the depth camera and sent to the computer 110, or the raw data collected by the depth camera may be sent to computer 110 for processing. In yet another alternative, the depth camera 120 may also determine the volume of space and its relative location to the absolute coordinate system and send all of this information to computer 110.

Figure 5:
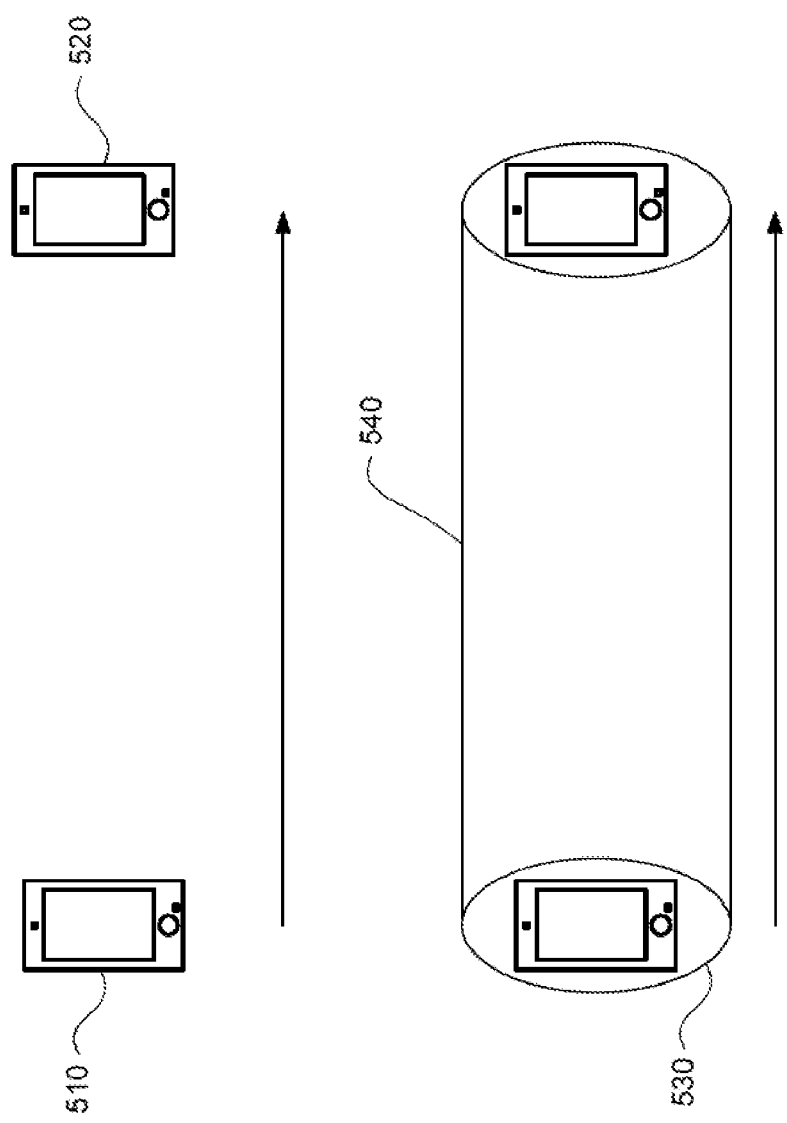
FIG. 5 is an example of defining a volume of space in accordance with aspects of the disclosure.
Figure 6:
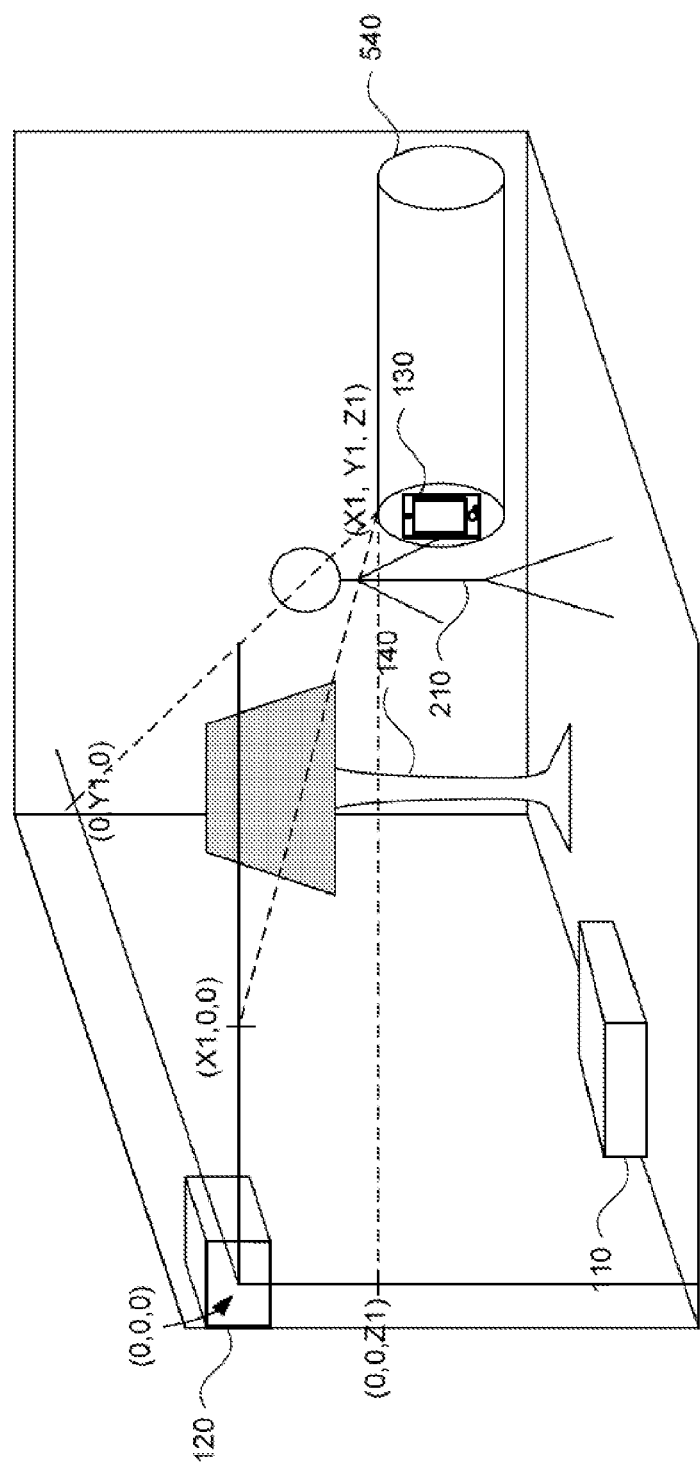
FIG. 6 is a diagram of the example room of FIG. 3 in accordance with aspects of the disclosure.

Various movements may be used to define a volume of space. FIG. 5 depicts on example of how a volume of space may be defined using device 130. In this example, a user may simply move the client device 130 from a first location 510 to a second location 520 during the recording. A two or three-dimensional shape such as a circle, sphere, or other shape may then be drawn around the client device (for example, by computer 110 or depth camera 120) and used to define the volume of space 540. FIG. 6 depicts an example of a point (X1,Y1,Z1) of volume of space 540 of a coordinate system relative to depth camera 120.

Figure 7:
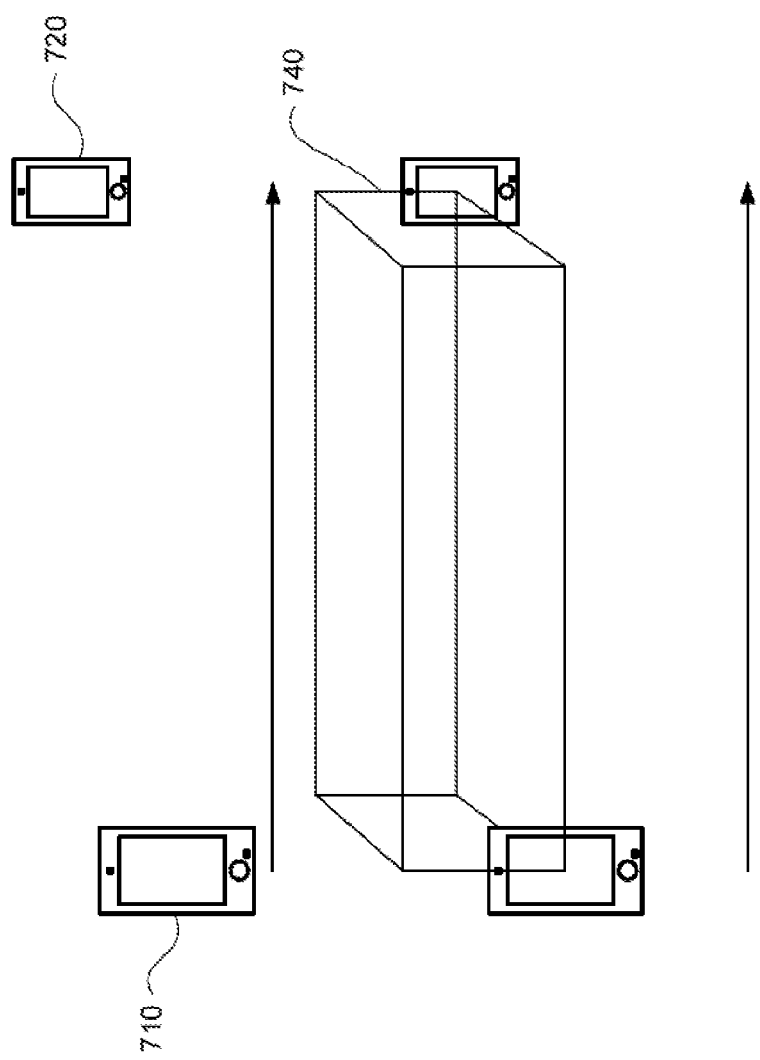
FIG. 7 is another example of defining a volume of space in accordance with aspects of the disclosure.
Figure 8:
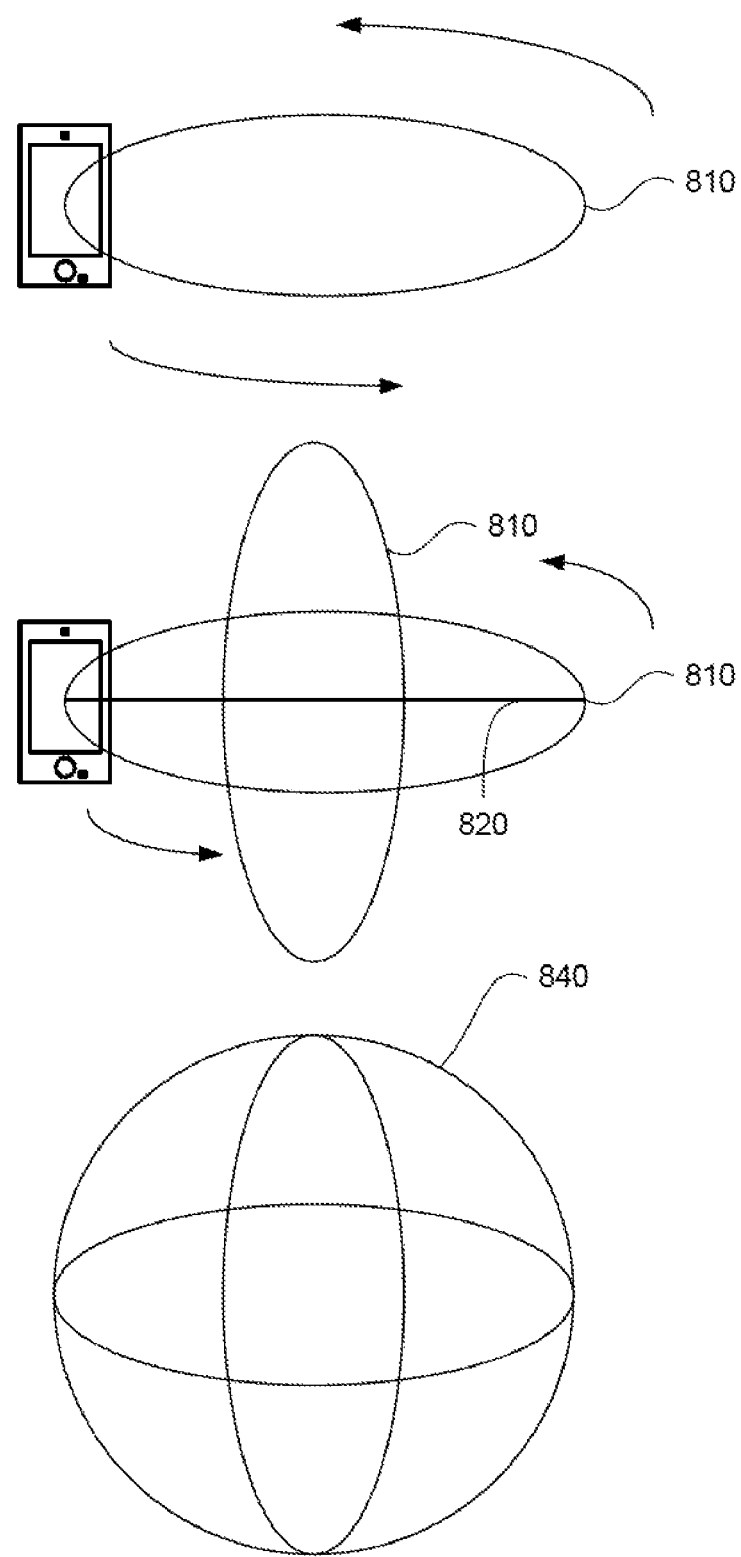
FIG. 8 is another example of defining a volume of space in accordance with aspects of the disclosure.

In the example of FIG. 7, a user, such as user 210, may identify a first location 710 and a second location 720 during the recording using device 130. These two locations may be used as the corners of a cuboid which represents the volume of space 740. FIG. 8 depicts yet another example of how a volume of space may be defined using client device 130. In this example, user 210 may move the client device 130 to define a closed shape 810 (the starting and ending points are the same). This closed shape 810 may then be rotated around an axis (such as axis 820 through the starting and ending points) to generate a three-dimensional version 840 of the closed shape 810 which represents the volume of space 840. This axis may also be outside of the closed shape, and may also be input or otherwise identified by the user 210. Alternatively, the volume may be defined by the closed shape itself such that no additional rotation is required.

Figure 9:
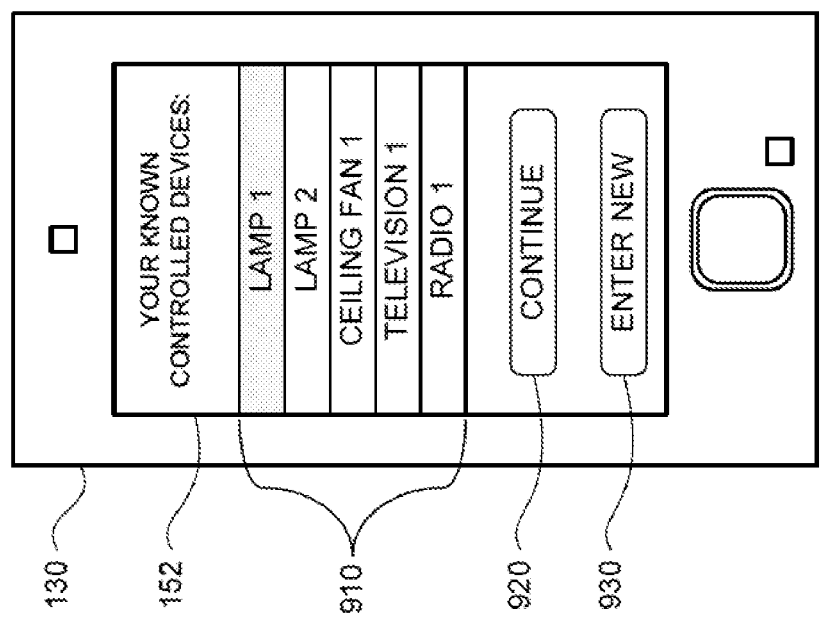
FIG. 9 is an example of a client device and display in accordance with aspects of the disclosure.

A user may input data identifying a controlled device. In one example, user 210 may input at the inputs 154 of the client device 130 to select or identify controlled device 140 as shown in FIG. 9. For example, display 152 may display a list 910 of controlled devices which are previously known to computer 110. In this example, "Lamp 1", the name associated with controlled device 140 of FIG. 4, is shown as selected. The user may then continue by selecting option 920 or input a new controlled device by selecting option 930.

Once the controlled device is identified, the user may select or input one or more control commands. In one example, the volume of space may represent an on/off toggle for the selected or identified controlled device. In this regard, using the example of the lamp 140, the control command may instruct the light to be turned on or off. These control commands, the identified controlled device, and the volume of space may be associated with one another and stored at computer 110.

Figure 10:
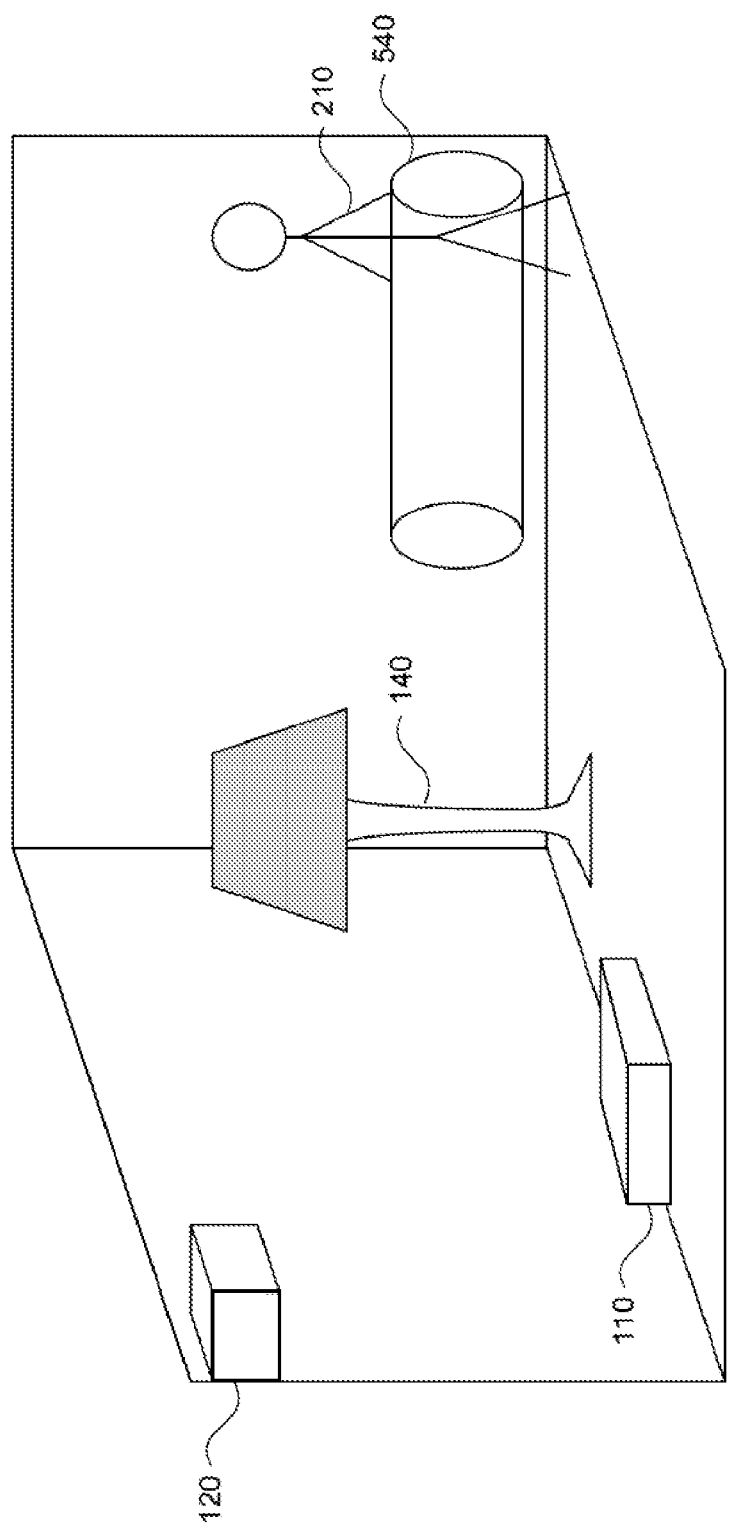
FIG. 10 is yet another example of defining a volume of space in accordance with aspects of the disclosure.

Once this data and associations are stored, the volume of space may be monitored to determine whether a stored volume of space is occupied. For example, as shown in FIG. 10, user 210 walks into room 300 passing though, and occupying, volume of space 540. User 210's body may be identified as occupying volume of space based on the physical location of user 210 with respect to the depth camera 120. Whether or not the volume of space is actually occupied may be determined by the camera 120 and this information subsequently sent to computer 110. Alternatively, the camera 120 may continuously send all of or any changes regarding the distance and location information determined or collected by the camera to computer 110. In this example, the determination of whether a volume of space 540 is newly occupied may be made by computer 110.

Figure 11:
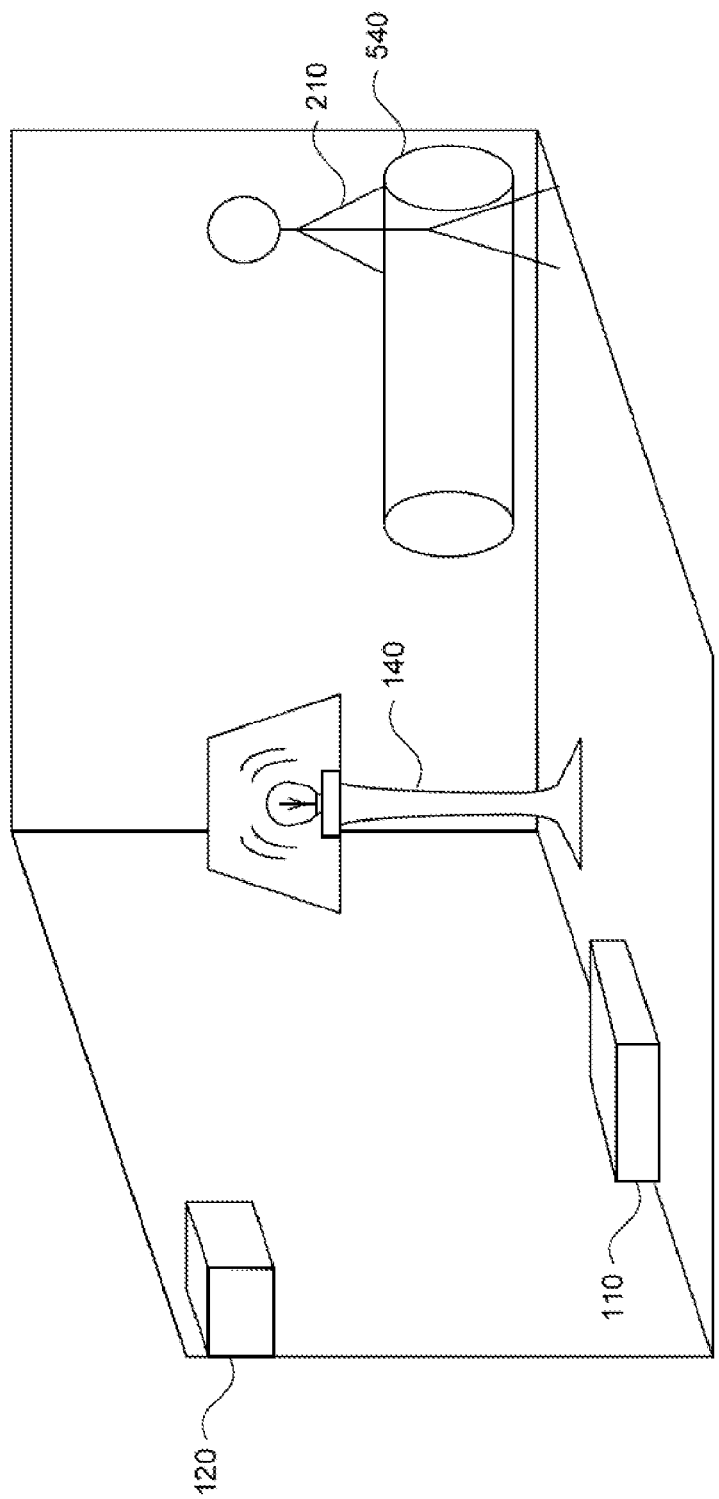
FIG. 11 is another view of the device of FIG. 1 in accordance with aspects of the disclosure.

Once it is determined that a volume of space is occupied, the one or more control commands associated with the volume of space 540 may be identified. In one example, the control command may be to turn on or off controlled device, such as lamp 140 depicted in room 300. This information is then sent to the controlled device to act upon the control command. Returning to the example of FIG. 10, when the user 210 enters room 300 and passes through volume of space 540, computer 110 may send a control command to switch on the lamp 140 as shown in FIG. 11. The actual command data sent to the controlled device may also be determined by the current state of the controlled device. Thus if the lamp 140 is on, the controlled command may turn the lamp 140 off and vice versa. In this regard, when the user 210 leaves the room 300 and once again passes through volume of space 540, this occupation may be recognized, and another control command may be sent to controlled device. As a result, the controlled device (the lamp 140) may be switched from on to off (shown again in FIG. 10).

Figure 12:
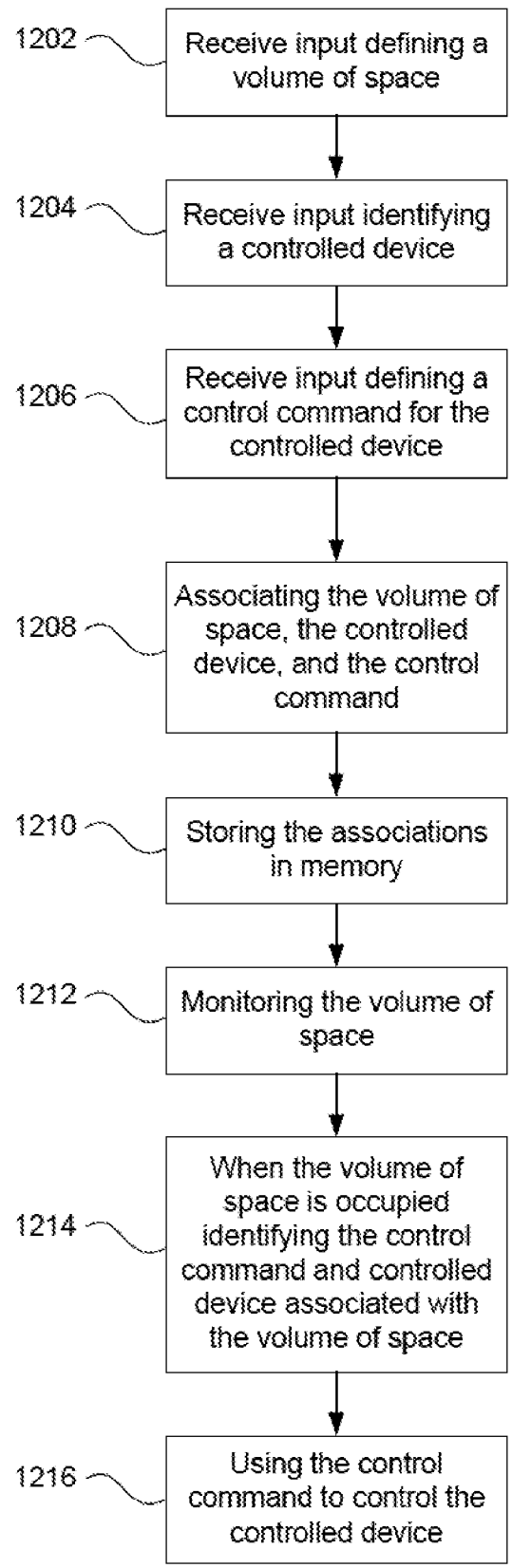
FIG. 12 is a flow diagram in accordance with aspects of the disclosure.

Flow diagram 1200 of FIG. 12 is an example of some of the aspects described above as performed by computer 110 and/or depth camera 120. In this example, input defining a volume of space is received at block 1202. Next, input identifying a controlled device is received at block 1204. Input defining a control command for the controlled device is also received at block 1206. The volume of space, the controlled device, and the control command are associated with one another at block 1208, and the associations are stored in memory at block 1210.

The volume of space is then monitored to determine when it is occupied at block 1212. When the volume of space is occupied, the control command and controlled device associated with the volume of space are identified at block 1214. The control command is then used to control the controlled device at block 1216.

Figure 13:
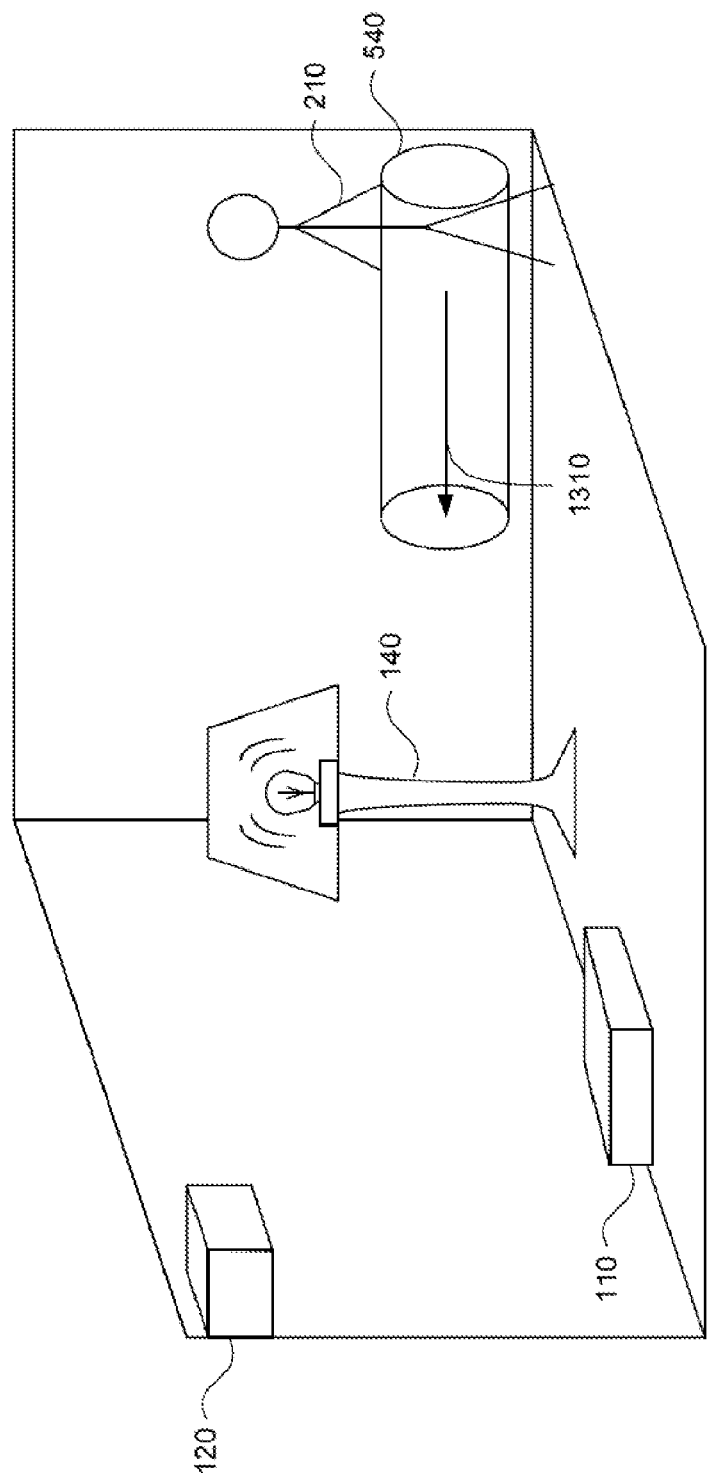
FIG. 13 is a diagram of the example room of FIG. 3 in accordance with aspects of the disclosure.
Figure 14:
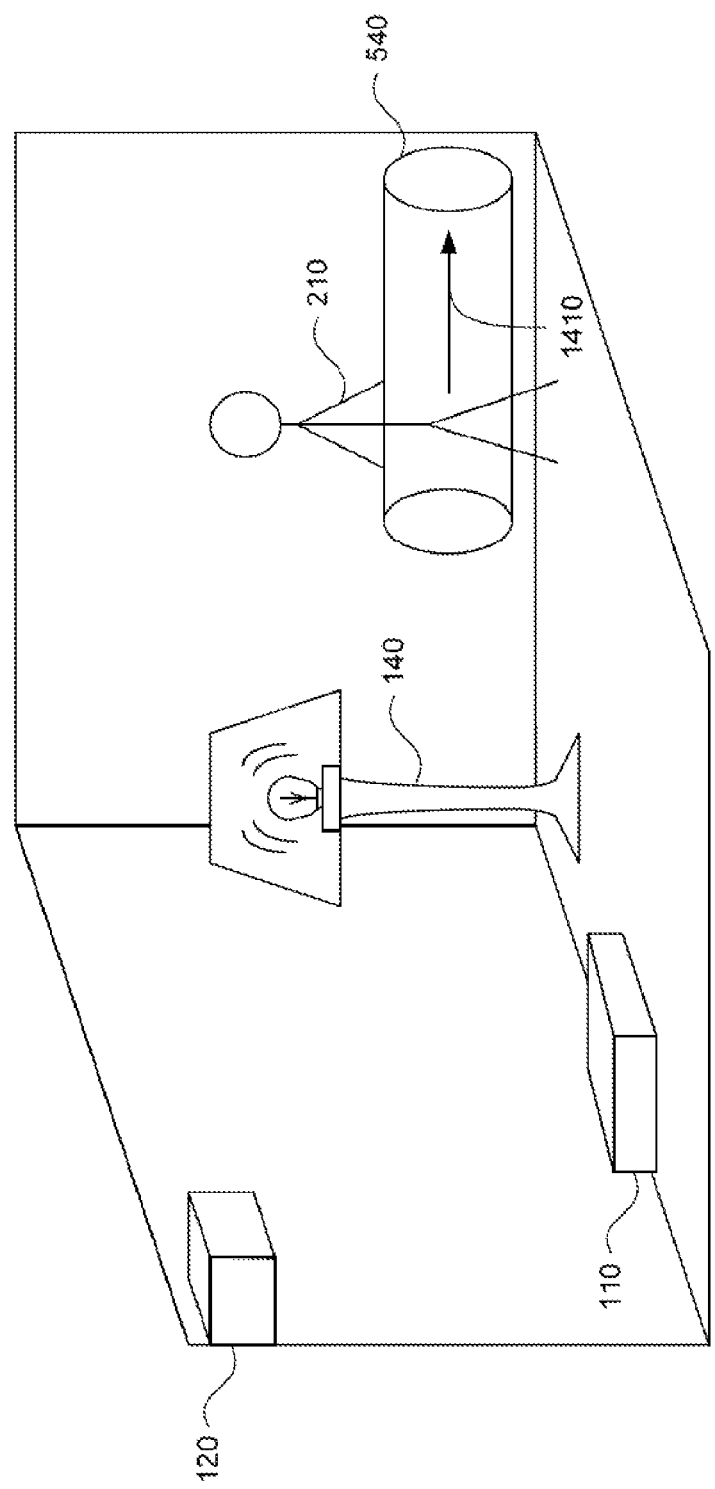
FIG. 14 is another diagram of the example room of FIG. 3 in accordance with aspects of the disclosure.

Instead of using a binary trigger (whether or not the volume is occupied), more complex triggers may be used. For example, by moving through a volume of space in a particular direction or at a particular point, the computer 110 may adjust the setting of a feature of a device based on the control commands associated with that type of movement through that particular volume of space. For example, depicted in FIG. 13, as user 210 walks into room 300 and passes through volume of space 540 the movement in the direction of arrow 1310 may be associated with a particular control commands that cause the lamp 140 to become brighter the further along arrow 1310 user 210 moves. Similarly, referring to FIG. 14, as user as user 210 walks into room 300 and passes through volume of space 540 the movement in the direction of arrow 1410 may be associated with a particular control command that causes the lamp to become dimmer the further along arrow 1410 user 210 moves. In other examples, moving an object or user through a particular volume of space may cause the volume of a device to increase, cause the speed of a fan to increase, etc. Similarly, the opposing movement may cause the opposite to occur, for example, decreasing the volume of a device, the speed of a fan, etc.

Rather than using the client device 130 to define the volume of space, other features may be used. For example, depth camera 120 may track an object having a particular color or characteristics, some feature of a person (hand, arm, etc.), some feature of a pet, etc. In these examples, the user 210 may be required to identify or select a controlled device as well as input the one or more control commands directly into computer 110. Thus, computer 110 may be a desktop computer, wireless-enabled PDA, hand-held navigation device, tablet PC, netbook, music device, or a cellular phone including user inputs 154 and a display as with client device 130.

Rather than using the user inputs 154 of client device 130 (or computer 110), a user may input information regarding when to start and stop recording a new volume of space, the identification or selection of a controlled device, and/or associate the one or more control command by speaking into a microphone. The computer 110 may receive information from the microphone and use speech recognition tools to identify information.

Figure 15:
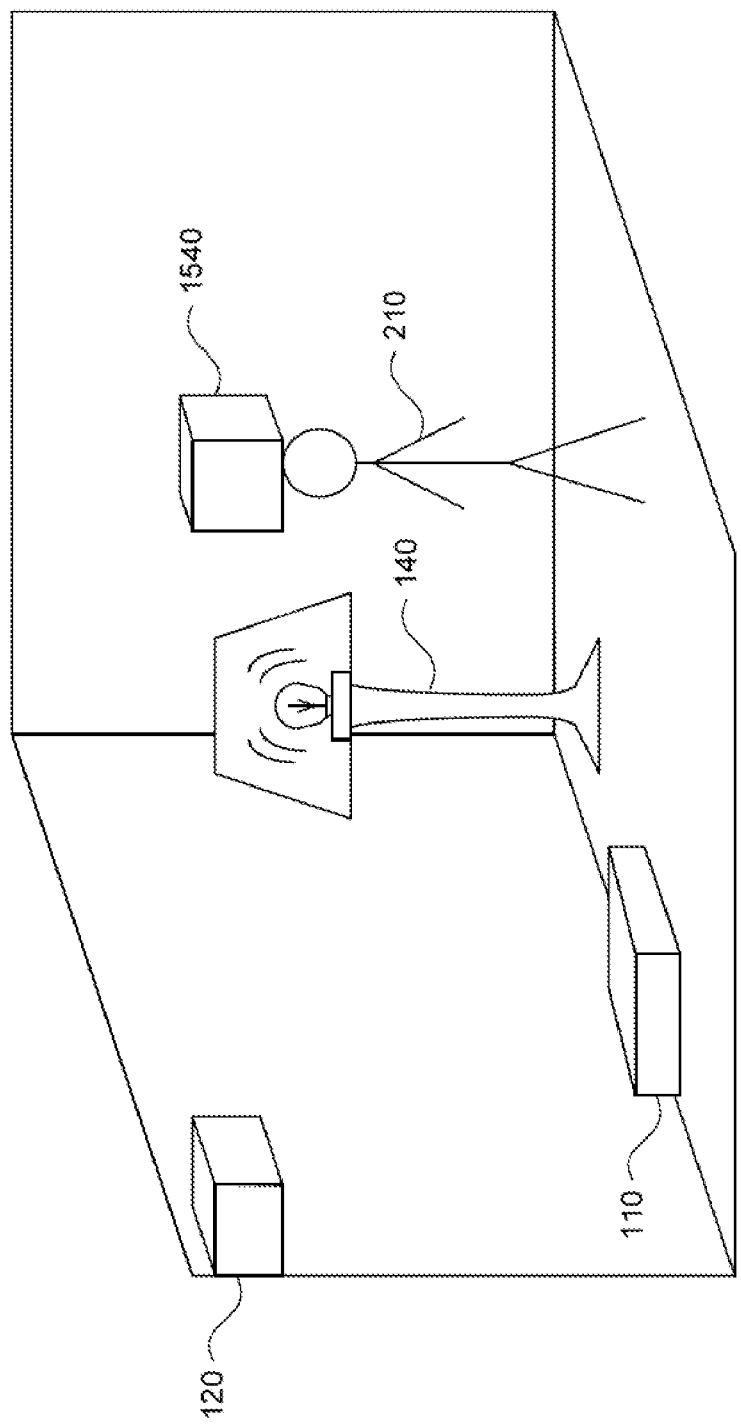
FIG. 15 is a further diagram of the example room of FIG. 3 in accordance with aspects of the disclosure.
Figure 16:
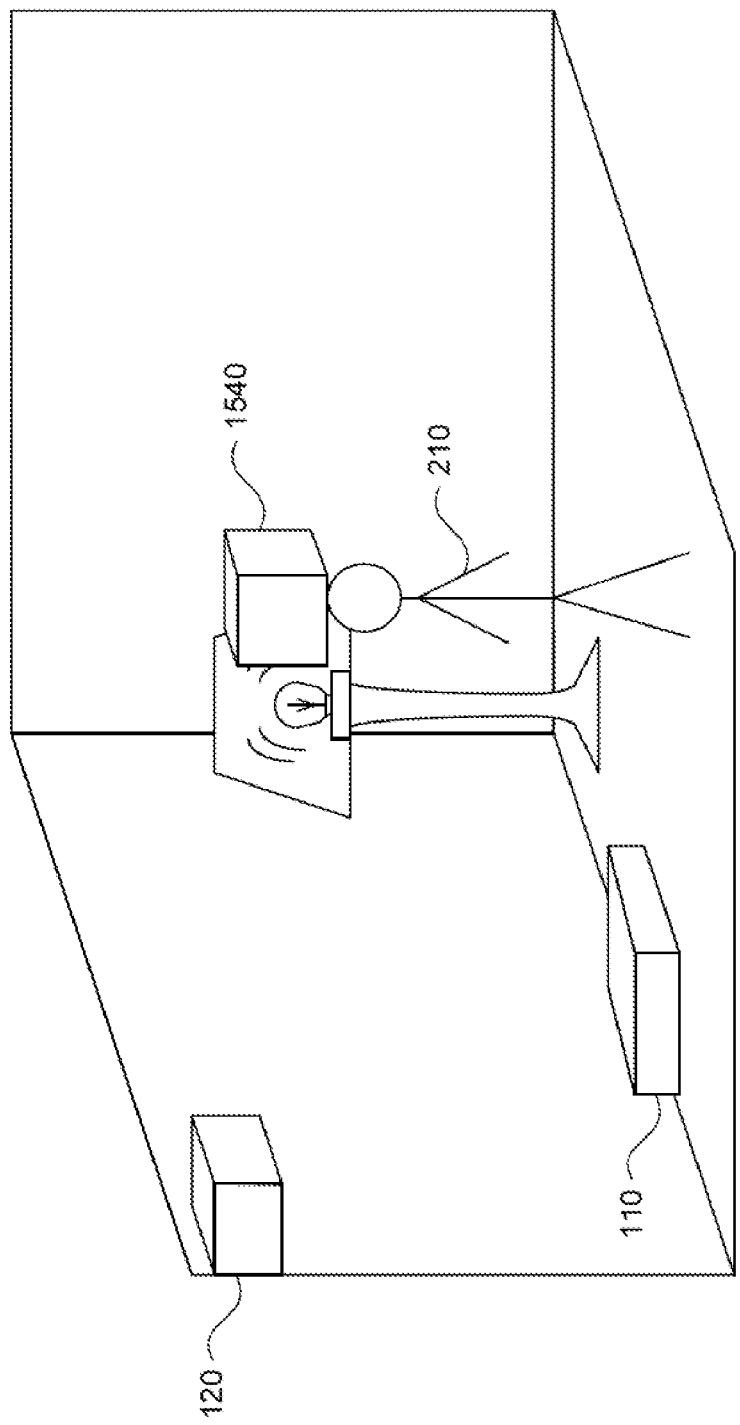
FIG. 16 is yet another diagram of the example room of FIG. 3 in accordance with aspects of the disclosure.

In the examples above, the volumes of space are defined relative to a coordinate system of the depth camera. Alternatively, a volume of space may be defined relative to a user's body or relative to a particular object. In these examples, the user's body or objects may be moved to different places in the room. A particular object or a user's body may be recognized using object recognition software which allows computer 110 and/or depth camera 120 to track changes in the location of the particular object or body. Any relevant volumes of space may be moved relative to the object accordingly. FIGS. 15 and 16 demonstrate this concept. In FIG. 15, user 210 is associated with a volume of space 1540 above the user's head. As user 210 moves to another location in room 300, the volume of space 1540 moves with the user as shown in FIG. 16.

In yet other examples, the volumes of space and/or the control commands may be associated with a particular user. For example, the computer may use facial recognition software to identify who a user is and identify that user's personal volumes of space and/or control commands. Returning to the example of FIG. 11, volume of space 540 may be associated only with user 210 and user's 210 control commands. When user's 210 walks through volume space 540, computer 110 may turn the controlled device 140 on and off. However, if another user walks through volume of space 540, but the computer 110 determines that it is not user 210, the computer 110 will not use user 210's control commands to control the controlled device 140. Thus, the light of FIG. 11 or 12 may not be turned on or off. In another example, the volume of space 540 may be associated with multiple sets of control commands for different user. In this regard, a second user's control command associated with volume of space 540 may cause a fan to turn on or off. Thus, if user 210 walks through the volume of space 540, computer 110 may turn the controlled device 140 (the light) may turn on and off, and if the second user walks though volume of space 540, computer may turn a fan on or off.

As these and other variations and combinations of the features discussed above can be utilized without departing from the subject matter defined by the claims, the foregoing description of the embodiments should be taken by way of illustration rather than by way of limitation of the subject matter defined by the claims. It will also be understood that the provision of the examples described herein (as well as clauses phrased as "such as," "including" and the like) should not be interpreted as limiting the invention to the specific examples; rather, the examples are intended to illustrate only one of many possible embodiments. Further, the same reference numbers in different drawings may identify the same or similar elements.

The invention claimed is:

1. A method comprising:
defining, by the one or more processors, a fixed volume of space by:
  receiving user input indicating when to begin recording the volume of space;
  while recording, receiving user input identifying a first location and a second location as fixed three-dimensional points defined in a real-world space by a user positioning a reference object; and
  determining the volume of space by drawing a shape around the reference object and moving the shape between the first location and the second location;
receiving, by the one or more processors, input identifying a controlled device;
receiving, by the one or more processors, input command information defining a set of control commands for the controlled device;
associating, by the one or more processors, the volume of space, the controlled device, and the set of control commands together;
storing, by the one or more processors, the association in memory;
monitoring, by the one or more processors, the volume of space;
when the one or more processors detects that the volume of space is occupied by an object, identifying, by the one or more processors, the set of control commands and the controlled device associated with the volume of space; and
using, by the one or more processors, the set of control commands to initiate control operations of the controlled device based on a movement of the object in a given direction with respect to the first location and the second location, the given direction being associated with at least one of the control commands from the set for operating the controlled device.

2. The method of claim 1, wherein the reference object is a two or three-dimensional shape, receiving the user input includes receiving information indicating that the user has moved the reference object from the first location to the second location.

3. The method of claim 1, wherein the input defining the volume of space is received from a depth camera and the depth camera is used to monitor the volume of space.

4. The method of claim 3, wherein the volume of space is defined relative to a coordinate system of the depth camera.

5. A system comprising:
memory;
a processor configured to:
define a fixed volume of space by:
  receiving input indicating when to begin recording the volume of space;
  while recording, receiving user input identifying a first location and a second location as fixed three-dimensional points defined in a real-world space by a user positioning a reference object; and
  determining the volume of space by drawing a shape around the reference object and moving the shape between the first location and the second location;
receive input identifying a controlled device;
receive input command information defining a set of control commands for the controlled device;
associate the volume of space, the controlled device, and the set of control commands together;
store the association in the memory;
monitor the volume of space;
when the processor detects that the volume of space is occupied by an object, identify the set of control commands and the controlled device associated with the volume of space; and
use the set of control commands to initiate control operations of the controlled device based on a movement of the object in a given direction with respect to the first location and the second location, the given direction being associated with at least one of the control commands from the set for operating the controlled device.

6. The system of claim 5, wherein the reference object is a two or three-dimensional shape, the processor is configured to receive the user input by receiving information indicating that the user has moved the reference object from the first location to the second location.

7. The system of claim 5, wherein the input defining the volume of space is received from a depth camera and the depth camera is used to monitor the volume of space.

8. The system of claim 7, wherein the volume of space is defined relative to a coordinate system of the depth camera.

9. A non-transitory, tangible computer-readable storage medium on which computer readable instructions of a program are stored, the instructions, when executed by one or more processors, cause the one or more processors to perform a method, the method comprising:
defining a fixed volume of space by:
  receiving input indicating when to begin recording the volume of space;
  while recording, receiving user input identifying a first location and a second location as fixed three-dimensional points defined in a real-world space by a user positioning a reference object; and
  determining the volume of space by drawing a shape around the reference object and moving the shape between the first location and the second location;
receiving input identifying a controlled device;

receiving input command information defining a set of control commands for the controlled device;

associating the volume of space, the controlled device, and the set of control commands together;

storing the association in memory;

monitoring the volume of space;

when the processor detects that the volume of space is occupied by an object, identifying, with the processor, the set of control commands and the controlled device associated with the volume of space; and using the set of control commands to initiate control operations of the controlled device based on a movement of the object in a given direction with respect to the first location and the second location, the given direction being associated with at least one of the control commands from the set for operating the controlled device.

10. The medium of claim 9, wherein the input defining the volume of space is received from a depth camera and the depth camera is used to monitor the volume of space.

11. The medium of claim 9, wherein the volume of space is defined relative to a coordinate system of a depth camera.

* * * * *